United States Patent [19]

Gibbon

[11] Patent Number: 5,686,158
[45] Date of Patent: Nov. 11, 1997

[54] LOW SPECIFIC GRAVITY SILICONE RUBBER GOLF CLUB GRIP

[75] Inventor: Robert M. Gibbon, Fort Worth, Tex.

[73] Assignee: JMK International, Inc., Fort Worth, Tex.

[21] Appl. No.: 370,340

[22] Filed: Jan. 9, 1995

Related U.S. Application Data

[63] Continuation of Ser. No. 121,802, Sep. 15, 1993, abandoned, which is a continuation of Ser. No. 797,431, Nov. 21, 1991, abandoned.

[51] Int. Cl.$^6$ .................................................. B29C 51/02
[52] U.S. Cl. ........................ 428/36.92; 428/340; 428/405; 428/327; 428/331; 473/201; 473/300
[58] Field of Search ............................ 472/201, 300; 428/34.5, 36.9, 36.5, 36.92, 340, 402, 405, 323, 327, 331, 447

[56] References Cited

U.S. PATENT DOCUMENTS

| | | | |
|---|---|---|---|
| 1,768,933 | 7/1930 | Riley. | |
| 2,297,204 | 9/1942 | Deissner | 18/47.5 |
| 2,342,556 | 2/1944 | Rockoff | 18/59 |
| 3,281,515 | 10/1966 | Schmitz | 264/236 |
| 3,353,981 | 11/1967 | Jacob | 117/8 |
| 3,539,671 | 11/1970 | Nauta | 264/102 |
| 3,864,443 | 2/1975 | Hopkins | 264/42 |
| 3,984,509 | 10/1976 | Hall | 264/40.1 |
| 4,143,109 | 3/1979 | Stockum | 264/112 |
| 4,268,574 | 5/1981 | Peccenini | 428/315 |
| 4,552,713 | 11/1985 | Cavicchioli | 264/162 |
| 4,904,434 | 2/1990 | Hyer | 264/146 |
| 4,981,637 | 1/1991 | Hyer | 264/146 |

*Primary Examiner*—Charles Nold
*Attorney, Agent, or Firm*—Jefferson Perkins

[57] ABSTRACT

A silicone rubber golf club grip comprises one hundred parts by weight of a high molecular weight polyorganosiloxane polymer, and approximately 20 to 40 parts by weight of a fumed silica filler having a surface area per gram of at least about 300 m$_2$.

19 Claims, 1 Drawing Sheet

LOW SPECIFIC GRAVITY SILICONE RUBBER GOLF CLUB GRIP

RELATED APPLICATIONS

This application is a continuation of application Ser. No. 08/121,802 filed Sep. 15, 1993, abandoned which is a continuation of application Ser. No. 07/797,431 filed Nov. 21, 1991, now abandoned.

TECHNICAL FIELD OF THE INVENTION

The present invention relates in general to elastomeric hand grips, and more particularly to a silicone rubber golf club grip having a sufficiently low specific gravity that is acceptable for use by original equipment manufacturers.

BACKGROUND OF THE INVENTION

Silicone rubber has been used commercially to substitute for natural rubber products. Silicone rubber has advantageous properties over natural rubber with respect to durability, flexibility over a wide temperature range and resistance to ozone and ultraviolet attack.

Given these superior properties, other investigators have fabricated golf club grips using silicone compositions. One such formulation is disclosed in U.S. Pat. No. 4,552,713 issued to Cavicchioli. The silicone rubber golf club grip composition disclosed by Cavicchioli includes a polyorganosiloxane gum, a filler material which is disclosed therein as possibly including fumed silica, an organosiloxane processing aid, a texturizing material such as a synthetic resin and a quantity of microspheres to give the finished grip a less slippery surface.

While a silicone golf club grip has thereby been fabricated that has the advantageous properties of silicone rubber, a problem has arisen in that the specific gravity of conventional silicone rubber compositions is too high for the specifications of original equipment golf club manufacturers (OEM's). A certain amount of filler, such as fumed silica filler, is necessary because the surface area provided by such filler improves the reinforcement of the polydiorganosiloxane polymer. Without it, a golf club or other hand grip of less than optimum strength and resiliency will be produced. However, fumed silica fillers and other silica filler that have heretofore been used in golf club grips have had to be added in amounts sufficient to substantially increase the specific gravity of the finished golf club grip to at least 1.15 or higher. Given the largely standardized dimensions of golf club grips, conventional silicone rubber golf club grips are unacceptably heavier than the OEM required golf club grip weight range of 48 to 51 grams.

Therefore, a need has arisen for a silicone rubber golf club grip that has good strength and resiliency characteristics, but is nonetheless light enough to fall within the weight requirements of original equipment golf club manufacturers.

SUMMARY OF THE INVENTION

According to the invention, a novel silicone rubber golf club grip is fabricated using a composition having one hundred parts of a high molecular weight polydiorganosiloxane. The composition also includes between 20 and 40 parts by weight of a fumed silica filler having a surface area per gram of at least about 300 m². Preferably, the polydiorganosiloxane has a molecular weight of approximately one million and a vinyl level between 0.05 and 2.0%. While this basic constituent can be a single polydiorganosiloxane gum, it is preferred that it result from a blend using at least two gums with different vinyl levels, such as a first gum having approximately 0.6% vinyl level blended with a second gum that has approximately an 0.2% vinyl level.

The filler is preferably present in the composition from about 31 to about 33 parts by weight. Other preferred constituents are a processing aid, such as hydroxyl-ended methyl vinyl polysiloxane which may be present in the composition in about five to six parts by weight; trimethyl-ended polymethylhydro siloxane as a cure accelerator and present in the composition in the range of one to two parts by weight, with the processing aid and the cure accelerator having molecular weights on the order of 2000; vinyl triethoxy silane, a cross-link densifier which may be present in the composition at about 0.8 parts; one or more tackifiers, such as HERCOLYN D, PICCOLYTE $S_{25}$ or ABALYN resin or a mixture of any of these, present in the range of five to eight parts by weight; and a preferably peroxide catalyst, such as VAROX, DICUP or TRIGONOX 29–95, present in the composition before curing from about one to three parts by weight.

Silicone rubber golf club grips formulated according to the above composition have specific gravities which are sufficiently reduced that they meet the weight ranges of original equipment golf manufacturers, such as 48 to 51 grams. Thus, the invention discloses a relatively light weight golf club grip which yet has the durability and chemical and radiation resistance of silicone rubber. The disclosed silicone rubber composition is also suitable for any application where a particularly lightweight, yet tough and durable, hand grip is needed.

BRIEF DESCRIPTION OF THE DRAWINGS

For a more complete understanding of the present invention, and the advantages thereof, reference is made to the following description taken in conjunction with the accompanying drawings, in which.

DETAILED DESCRIPTION OF THE INVENTION

Figure 1:
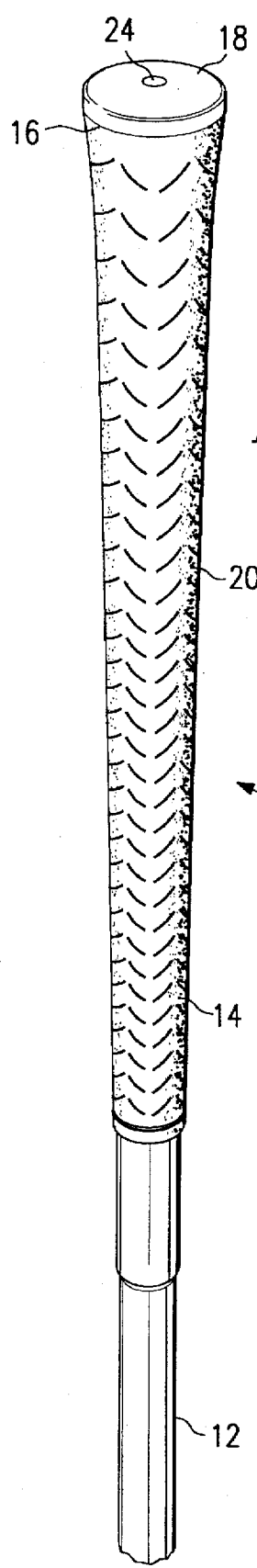
FIG. 1 is a perspective view of a golf club grip according to the invention, shown mounted on a golf club shaft.

A silicone rubber composition used in the fabrication of a golf club grip according to the invention preferably includes one hundred parts of a high molecular weight polyorganosiloxane elastomer or gum. The polyorganosiloxane elastomers employed in the practice of the present invention are well known materials and can be made by standard methods known in the art. The silicone elastomer stock may be based on polyorganosiloxane gums which contain methyl, vinyl, phenyl and/or 3,3,3-trifluoropropyl radicals attached to the silicon atoms of the polymer chain. Examples of such polyorganosiloxane gums are those polymers, copolymers and mixtures thereof in which the siloxy units may be dimethylsiloxane, phenylmethylsiloxane, 3,3,3 trifluoropropylmethyl siloxane, diphenylsiloxane, methylvinylsiloxane and phenylvinylsiloxane. Preferably, the polyorganosiloxane gum has trimethylsiloxy chain stopping units. For details as to the fabrication of such polyorganosiloxane gums, reference is made to U.S. Pat. No. 4,552,713 issued to Cavicchioli, which is fully incorporated herein by reference.

More preferably, the polyorganosiloxane gum is predominantly polydimethylsiloxane with a minor portion of methyl units. The vinyl level range for the polysiloxane gum should be between 0.15 and 1.6 weight percent and more preferably is between approximately 0.47 and 0.50 weight percent. This can be obtained by supplying a single gum having this vinyl level, or by adjusting a blend of at least two gums having different vinyl levels. The polyorganosiloxane gum can be composed of, for example, approximately 25% of an 0.2% vinyl level gum with approximately 75% of an 0.6% vinyl level gum. Alternatively, the polydiorganosiloxane gum may be composed of approximately 30% of an 0.2% vinyl level gum and approximately 70% of an 0.6% vinyl level gum. The precise blend will be determined by the relative amount of yield-ability or resilience of the grip to be produced. The molecular weight of these main polymer constituents is preferably on the order of one million.

An important constituent of the silicone rubber composition of the invention is fumed silica. Prior art compositions, such as that found in the Cavicchioli U.S. Pat. No. 4,552,713, used a fumed silica having a surface area of no more than about 200 $m^2$/gram. Fumed silica or the like is necessary to increase polymer reinforcement, and to thereby produce a hand grip that is tough, durable and resilient. In order to obtain a sufficiently strong and resilient grip, it was necessary to specify a filler level that increased the specific gravity of the resultant grip to the point that it was unacceptable to original equipment manufacturers.

According to the invention, this conventional fumed silica is replaced with another fumed silica filler having a surface area of at least approximately 250–350 $m^2$/gram, or an average of 300 $m^2$/gram. Such a fumed silica filler is available under the trademark AEROSIL 300 from De Gussa. Using a high surface area fumed silica filler, the relative amount of fumed silica filler that is necessary can be reduced, such that the specific gravity of the produced golf club grip is reduced by a commensurate amount. With AEROSIL 300, specific gravities of approximately 1.10 may be achieved for strong, tough hand grips. It is also possible to use an even smaller amount of a fumed silica filler having a higher surface area. For example, AEROSIL 400 could be used, to obtain even more reinforcement of the silicone polymer. AEROSIL 400 has a surface area in the range of 350–450 $m^2$/gram.

The filler should be present in the composition in an amount in the range of 20 to 40 parts by weight relative to 100 parts by weight of the high molecular weight polysiloxane elastomer. It is particularly preferred that the fumed silica filler be present in an amount of approximately 32 to 33 parts by weight relative to one hundred parts by weight of the polydiorgano-siloxane elastomer stock. In order to meet the target of a 48 to 51 gram hand grip specified by original equipment golf club manufacturers, the fumed silica filler should vary in amount by no more than 30 to 33 parts by weight. For other hand grips, different amounts of high surface area filler may be used.

A further preferred constituent of the composition is an organosiloxane processing aid. Such processing aids may be selected from, for example, silanol-terminated polydiorganosiloxanes such as taught by Konkle et al., U.S. Pat. No. 2,890,188; alkoxy-terminated polydiorganosiloxanes, such as taught by Fekete, U.S. Pat. No. 2,954,357; and silazane, silylamine or other silicon-nitrogen materials as taught by Marteilock, U.S. Pat. No. 3,243,404. The processing aids may be silanol-terminated polydimethylsiloxanes, or silanol-terminated polydiorganosiloxanes consisting essentially of chemically combined dimethylsiloxy units. Silanols such as diphenylsilanediol may also be employed. These silanol-terminated materials may be made by well-known methods such as hydrolyzing diorganodihalosilanes in the presence of acetone and an alkali bicarbonate such as shown by U.S. Pat. No. 2,744,923 issued to Duayne. Alkoxy-terminated polydiorganosiloxanes processing aid which may be employed in the invention include polysiloxanes having from about 4 to about 35 diorganosiloxy units terminated with alkoxy radicals. Suitable processing aids are alkoxy-terminated, such a methoxy, ethoxy, hydroxy, propoxy and butoxy terminated polydimethylsiloxane, polydiorganosiloxane consisting essentially of chemically combined dimethylsiloxy units, diphenylsiloxy unit, methylphenylsiloxy units, etc. Other processing aids may include cyclic or linar siloxane, or mixtures of any of the above, as set forth in U.S. Pat. No. 4,552,713 issued to Cavicchioli.

It is preferred that the processing aid used be a hydroxyl-ended methyl vinyl polysiloxane having a molecular weight of approximately 2000. This processing aid may be present in the composition in the range of 3 to 8 parts by weight, and preferably between five and six parts by weight relative to 100 parts of the high molecular weight polysiloxanes. The hydroxy level in the processing aid may range from approximately 2% to approximately 6% by weight of the processing aid. It is preferred that the hydroxy level in the processing aid be about 3.0%.

A further component of the composition may be a cure accelerator to aid in the curing of the high-molecular weight polydiorganosiloxane gum. Such a cure accelerator may be a methyl hydrogen polysiloxane, preferably in which each silicon atom of a siloxy unit has one methyl group and one hydrogen group attached to it. A preferred cure accelerator is trimethyl-ended polymethylhydro-siloxane with a molecular weight of approximately 2000. Such a cure accelerator may be present in the composition in the range of 0.5 to 2.5 parts by weight, and preferably is in the range of 1.5 to 1.9 parts for 100 parts of the high molecular weight polydiorganosiloxanes.

Another component of the composition may be a cross-link densifier. Such a densifier should have a vinyl group to react into the rubber and must have at least one alkoxy group, e.g., methoxy, ethoxy or methoxyethoxy which can react with the hydroxyls of the fumed silica surface. Such a cross-link densifier is vinyl triethoxy silane, a preferred cure accelerator for the composition of the invention. It may be present between 0.1 to 1.5 parts by weight relative to one hundred parts of the high molecular weight polydiorganosiloxane gum, and preferably is present at approximately 0.8 parts per hundred parts of the gum.

The silicone rubber composition according to the invention may also contain one or more texturizing or tackifying materials. The tackifying material of the invention may be any material selected from the group consisting of synthetic resins, rosins, and pitch. These tackifiers are added to the rubber composition in amounts effective to provide a non-slip character to the finished grip. The texturizing material is dispersed within the elastomer during the blending operation, and does not copolymerize or react with the elastomer. Suitable synthetic resins include ZONAREZ B-115, manufactured by Arizona Chemical Co. of Fairlawn, N.J. and NEVTAC-100, manufactured by Neville Chemical Co. of Pittsburgh, Pa. These resins are polyterpine resins. Another resin is ABALYN resin, available from Hercules Corporation. Especially preferred tackifiers include HERCOLYN-D, a methyl ester of a partially hydrogenated rosin available from Hercules Corporation, and PICCO-LYTE S5, a tackifier which consists essentially of polymerized beta-pinene and which is available from Hercules Corporation. Tackifiers may be present in the composition according to the invention between seven and 200 parts per hundred parts of the high molecular weight polydiorganosiloxane gum. More preferably, the range of tackifying material is from seven to 40 parts, and most preferably is about seven to eight parts per one hundred parts of the gum.

The composition according to the invention requires a curing catalyst to cure the high molecular weight polydiorganosiloxane gum. Such curing agents are preferably peroxides and include benzoyl peroxide; (2,5-dimethyl, 2,5-di-t-butyl peroxy) hexane; t-butyl perbenzoate, bis (2,4-dichlorobenzyl) peroxide, di-t-butyl peroxide, dicumyl peroxide, t-butyl peroxyisopropyl carbonate, and others. These curing agents or vulcanization accelerators can be present in the composition in amounts ranging from about 0.1 to as high as four to eight parts or more based on one hundred parts of the high molecular weight, polydiorganosiloxane gum depending on the catalyst used. Platinum-based curing agents may also be used in substantially reduced amounts relative to the peroxide-based curing agents above described.

Preferred curing agents include TRIGONOX 29–95, a trademark for di-ti-butyl peroxytrimethylcyclohexane and available from Akzo Chemic; VAROX, a trademark for dimethyl t-butylperoxyhexane; and DICUP, a trademark for dicumyl peroxide. A particularly preferred curing agent is TRIGONOX 29–95, which can be present in the composition in amounts ranging from 1 to 4 parts per hundred parts of the high molecular weight polydiorganosiloxane gum. A particularly preferred range is 2.2 to 2.7 parts per hundred parts of the gum.

In forming a hand grip according to the invention, the silicone rubber composition above described is made by blending or milling together the various constituents. The order of adding the elastomer, filler, processing aid and additional additives is not critical. Preferably, polydiorganosiloxane elastomer, filler, organosiloxane processing aid, tackifiers and other additives are mixed together to form an uncured rubber composition. This uncured silicone rubber composition is heated during a blending operation and the tackifying material is evenly dispersed within the elastomer without reacting to it. Although the preferred method of blending is to hot mix the rubber composition, it will be understood that the composition could be cold mixed, depending, for instance, upon the tackifier used. Tackifiers which are liquids at room temperature can be used in cold mixing the compositions. The uncured silicone rubber composition is then cooled, placed in a suitable mold, and cured using one of the above curing agents to form the golf club grip. The temperatures at which the silicone rubber compositions are cured to the solid elastomeric state depend upon the particular curing catalyst chosen, duration of cure, amount and type of additives, etc.

EXAMPLE

A silicone rubber golf club grip was fabricated according to the following formulation:

TABLE

| | Parts by Wt. Rel. to 100 parts high mw polymer | |
|---|---|---|
| High Molecular Weight Silicone Polymer | | |
| 1. 0.6% Vinyl Level | 68.9 | 100 |
| 2. 0.2% Vinyl Level | 31.1 | parts |

TABLE-continued

| | Parts by Wt. Rel. to 100 parts high mw polymer |
|---|---|
| Process Aid | |
| Hydroxyl-ended methyl Vinyl Polysiloxane Cure Accelerator | 5.3 |
| Trimethyl-ended methyl hydrogen polysiloxane Filler | 1.9 |
| Fumed silica: Aerosil 300 (Approx. 300 sq. meters/g) Additives | 32.6 |
| Cross-Link Densifier Vinyltriethoxysilane Tackifiers | 0.8 |
| 1. HERCOLYN D | 7.0 |
| 2. PICCOLYTES $2_{25}$ Curing Agent | 5.0 |
| Peroxide (TRIGONOX 29-95) (Di t-butyl peroxy trimethylcyclohexane) | 2.2 |

The tabulated composition produced a silicone rubber golf club grip having a specific gravity of approximately 1.10.

FIG. 1 is a perspective view of a preferred embodiment of a silicone golf club grip, indicated generally at 10. The golf club grip 10 is mounted on the end of a club shaft 12 which can be one of two standard diameters. The grip 10 is molded with a suitable grip design 14, and preferably flares radially outward toward its upper end 16. A butt 18 may be molded using a different durometer silicone rubber than that for the axial portion 20; in one embodiment, the butt 18 is fabricated using 70 durometer silicone, while the axial portion 20 is fabricated using 55 durometer silicone. The durometer reading of the silicone may be adjusted, for example, by increasing or decreasing the vinyl level in the high molecular weight polydiorganosiloxane gum that is used. Alternatively, the filler level of butt 18 can be elevated over that of portion 20 to increase hardness.

Figure 2:
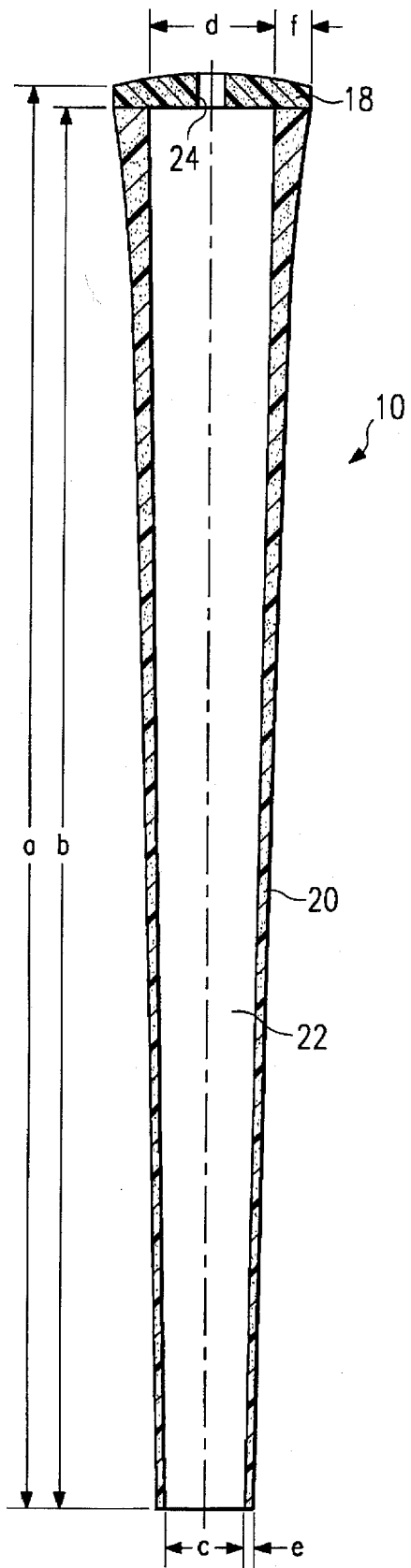
FIG. 2 is an axial sectional view of the golf club grip shown in FIG. 1.

FIG. 2 is an axial sectional view of the golf club 10 shown in FIG. 1. The golf club grip has a total length of dimension a, which for example can be 10.33 inches. A dimension b, which is the length exclusive of the butt 18, is in a preferred embodiment approximately 10.12 inches. An axial portion 20 of the golf club grip defines a cavity 22 which is frusto-conical in shape, varying in a linear fashion from an interior diameter (dimension c) at its lower end to a larger interior diameter (dimension d) at its upper end. For a club shaft of 0.6 inch diameter, it is preferred that dimension c be 0.477 inches and dimension d be 0.584 inches. For a club head shaft diameter of 0.580 inches, dimension c should be 0.477 inches while dimension d should be 0.566 inches.

The thickness of the sidewall of axial section 20 varies from approximately 0.07 inches for the thickness e at the lower end of the axial section 20 to 0.28 inches at its upper end, shown by dimension f.

It is preferred that the butt 18 be co-molded to the end of the axial section 20. Butt 18 is preferably of a higher durometer reading 80 so that it can take impact more easily, while axial section 20 be of a lower durometer reading so that it is more yieldable and comfortable to the hand. Butt 10 is preferably formed with a hole 24 in its center to permit the escape of air as the grip 10 is worked onto the shaft 12.

Silicone rubber golf club grips as shown in FIGS. 1 and 2, when made with the composition of Table I, have weights falling between 48 and 51 grams, and are thus acceptable to original equipment manufacturers in the golf club industry.

In summary, a low specific gravity, silicone rubber golf club grip has been shown and described. The golf club grip combines the advantageous durability and environmental resistance of silicone rubber with an optimum lightness in weight.

Although the present invention and its advantages have been described above in detail, it should be understood that various changes, substitutions and alterations can be made therein without departing from the spirit and scope of the invention as defined by the appended claims.

What is claimed is:

1. A silicone rubber golf club grip, comprising:
   100 parts by weight of a high molecular weight polyorganosiloxane polymer; and
   between 20 and 40 parts by weight of a filler consisting of a fumed silica filler having a surface area per gram of at least about 300 square meters, and no nonreinforcing filler.

2. The golf club grip of claim 1, wherein the total weight of said grip is in the range of 48 to 51 grams.

3. The golf club grip of claim 2, wherein said grip has a length of about ten inches.

4. The golf club grip of claim 3, wherein said grip has an internal bore coaxial to the length thereof that is sized to fit a shaft of a golf club having an external radius in the range of 0.58 to 0.60 inches.

5. The golf club grip of claim 1, wherein said polyorganosiloxane polymer comprises at least one polydiorganosiloxane having a major portion of methyl organo groups and a minor portion of vinyl organo groups.

6. The golf club grip of claim 5, wherein said polydiorganosiloxane has a molecular weight on the order of one million and a percentage by weight of vinyl groups in the range of 0.15 to 1.6 percent relative to all of the organo groups.

7. The golf club grip of claim 5, wherein said polyorganosiloxane polymer comprise a blend of at least two polydiorganosiloxanes, a first of said polydiorganosiloxanes having about 0.6 percent vinyl groups relative to the total organo groups, a second of the polydiorganosiloxanes having about 0.2 percent vinyl groups relative to the total number of organo groups.

8. The golf club grip of claim 1, wherein said fumed silica filler is present in the range of about 30 to about 33 parts by weight relative to one hundred parts of the polyorganosiloxane polymer.

9. The silicone rubber golf club grip of claim 1, and further comprising a tackifier present in the range of about 5 to 8 parts by weight relative to one hundred parts of the polyorganosiloxane polymer.

10. The golf club grip of claim 9, wherein said tackifier is selected from the group consisting of abalyn resin, HERCOLYN D, PICCOLYTE $S_{25}$ and mixtures thereof.

11. The golf club grip of claim 1, and further comprising about 0.8 parts by weight vinyl trialkoxy silane.

12. The golf club grip of claim 1, and further comprising from one to three parts by weight of a peroxide curing catalyst.

13. The golf club grip of claim 1, and further comprising, as a processing aid, an alkoxy- or hydroxy- terminated polydiorganosiloxane having a molecular weight substantially less than said high molecular weight polyorganosiloxane polymer.

14. The golf club grip of claim 13, wherein said processing aid comprises hydroxyl-ended polymethylvinyl siloxane having a molecular weight of approximately 2000 and present in the composition in the range of about four to five parts by weight.

15. The golf club grip of claim 1, and further comprising trimethyl-ended polymethylhydrosiloxane having a molecular weight of approximately 2000 and present in the composition in the range of about one to about two parts by weight relative to one hundred parts by weight of said polyorganosiloxane polymer.

16. A silicone rubber golf club grip, comprising:
   one hundred parts by weight of high molecular weight polydiorganosiloxane, with the organo groups thereof comprising between 98 and 99.95 percent methyl and the remainder vinyl;
   between about thirty and about forty parts by weight of a filler consisting of a fumed silica filler having a surface area of at least 300 square meters per gram and no nonreinforcing filler; and
   a curing catalyst for cross-linking said high molecular weight polydiorganosiloxane.

17. The golf club grip of claim 16, and further comprising about five to about six parts by weight relative to 100 parts by weight of the high molecular weight polydiorganosiloxane, of hydroxyl-ended polysiloxane with a hydroxyl level of about two to six weight percent thereof and a molecular weight on the order of 2000.

18. The golf club grip of claim 16, and further comprising about one to two parts by weight relative to 100 parts by weight of the high molecular weight polydiorganosiloxane, of trimethyl-ended polymethylhydrosiloxane having a molecular weight on the order of 2000.

19. The golf club grip of claim 16, and further comprising about 0.8 parts by weight of vinyl trialkoxy silane, relative to 100 parts by weight of the high molecular weight polydiorganosiloxane.

* * * * *